United States Patent
Svenonius et al.

(10) Patent No.: US 9,541,654 B2
(45) Date of Patent: Jan. 10, 2017

(54) X-RAY SCINTILLATOR CONTAINING A MULTI-LAYERED COATING

(71) Applicant: SCINT-X AB, Kista (SE)

(72) Inventors: Olof Svenonius, Djursholm (SE); Anna Sahlholm, Huddinge (SE); Peter Norlin, Uppsala (SE)

(73) Assignee: SCINT-X AB, Kista (SE)

( * ) Notice: Subject to any disclaimer, the term of this patent is extended or adjusted under 35 U.S.C. 154(b) by 0 days.

(21) Appl. No.: 14/759,661

(22) PCT Filed: Dec. 13, 2013

(86) PCT No.: PCT/SE2013/051510
§ 371 (c)(1),
(2) Date: Jul. 8, 2015

(87) PCT Pub. No.: WO2014/109691
PCT Pub. Date: Jul. 17, 2014

(65) Prior Publication Data
US 2015/0338529 A1    Nov. 26, 2015

Related U.S. Application Data

(60) Provisional application No. 61/750,027, filed on Jan. 8, 2013.

(51) Int. Cl.
*G01T 1/20* (2006.01)
(52) U.S. Cl.
CPC .................. *G01T 1/2002* (2013.01)
(58) Field of Classification Search
CPC ..................................... G01T 1/2002
(Continued)

(56) References Cited

U.S. PATENT DOCUMENTS

| 5,241,180 A | 8/1993 | Ishaque et al. |
| 5,519,227 A | 5/1996 | Karellas |

(Continued)

FOREIGN PATENT DOCUMENTS

| EP | 0 250 983 A1 | 1/1988 |
| EP | 0 534 683 A2 | 3/1993 |

(Continued)

OTHER PUBLICATIONS

International Search Report, dated May 14, 2014, from corresponding PCT application.

*Primary Examiner* — David Porta
*Assistant Examiner* — Gisselle Gutierrez
(74) *Attorney, Agent, or Firm* — Young & Thompson

(57) ABSTRACT

There is provided an x-ray scintillator (10) including a pore matrix having a plurality of pores formed in a substrate (1). Each of the pores is at least partially covered with a multi-layered coating including at least a reflective layer (2) and a protective layer (3). The at least partially coated pores are filled with scintillating material (4) for absorbing x-ray photons to produce secondary photons, preferably with a wavelength in the visible range. The reflective layer (2) of the multi-layered coating is arranged between the scintillating material (4) and the substrate (1) for reflecting the secondary photons, and the protective layer (3) of the multi-layered coating is arranged between the reflective layer (2) and the scintillating material (4) for protecting the reflective layer while allowing reflection of the secondary photons by the reflective layer.

14 Claims, 6 Drawing Sheets

(58) Field of Classification Search
USPC .................................................. 250/486.1
See application file for complete search history.

(56) References Cited

U.S. PATENT DOCUMENTS

| | | | |
|---|---|---|---|
| 6,117,236 | A | 9/2000 | Ruschak et al. |
| 6,344,649 | B2 | 2/2002 | Riedner et al. |
| 6,452,186 | B1 | 9/2002 | Wieczorek et al. |
| 6,744,052 | B1 | 6/2004 | Petersson et al. |
| 2008/0121808 | A1* | 5/2008 | Roizin .................. G01T 1/2018 250/370.11 |
| 2008/0290285 | A1* | 11/2008 | Wakamatsu ......... C09K 11/616 250/370.11 |
| 2009/0026383 | A1* | 1/2009 | Kim .................. H01L 27/14683 250/370.11 |
| 2009/0101844 | A1* | 4/2009 | Ohbayashi ................ G01T 1/20 250/488.1 |

FOREIGN PATENT DOCUMENTS

| | | |
|---|---|---|
| WO | 2010/092869 A1 | 8/2010 |
| WO | 2012/004703 A2 | 1/2012 |

* cited by examiner

X-RAY SCINTILLATOR CONTAINING A MULTI-LAYERED COATING

TECHNICAL FIELD

The invention generally relates to x-ray imaging and an x-ray scintillator, and more particularly to applications where a scintillator and a pixelated image sensor are used in combination to capture an x-ray image. The invention also relates to an x-ray detector, an x-ray imaging system, and a scintillator mold and a method of fabricating such a mold, as well as a method of fabricating a scintillator.

BACKGROUND

It is common practice to use a scintillator in combination with an image sensor to capture x-ray images. In such a setup, the image sensor is placed behind the scintillator. However, by laws of nature, the scintillator can only absorb a certain fraction of all x-ray photons that enter the scintillator's surface. As a consequence, it is important for best detector performance and image quality to best utilize the information carried by each x-ray photon that is absorbed in the scintillator. In the scintillation process, the energy of an x-ray photon is transferred to a large number of secondary photons, with a wavelength in the visible range, which can be detected by the image sensor. Because of noise generated in the image sensor, it is important to construct the scintillator so as to maximize the number of secondary photons that reach and can be detected by the image sensor. This will result in an x-ray detector with good signal-to-noise ratio.

It is a general requirement in x-ray imaging to achieve the best possible image quality, often interpreted as the balance between high resolution (sharpness) and high signal-to-noise ratio. These two image requirements are typically contradictory so that high resolution often is accompanied by reduced signal-to-noise ratio and vice versa.

Various techniques have been proposed for the fabrication of a structured scintillator, which is based on a structured array or matrix of pores filled with scintillating material that would provide light guiding of secondary photons to an underlying imaging sensor. These techniques are all restricted in one or several aspects: either too large lateral dimensions (cutting, dicing), problems of forming a well-defined narrow wall (laser ablation), cross talk between adjacent pixels (columnar growth technique) or a lengthy processing time (valid for most of these techniques).

Deposition of a reflective coating on the pore walls has been suggested to improve light guiding and reduce cross talk, but designing and producing a feasible and efficient solution is generally not an easy task considering the manufacturing process, the narrow pore geometry and materials involved.

U.S. Pat. No. 6,744,052 generally concerns the basic design of a structured scintillator, and also introduces a quite satisfactory solution for providing light guiding of secondary photons based on an embedded reflective coating in the scintillator.

U.S. Pat. No. 6,344,649 relates to a scintillator having a plurality of scintillator elements laid out in an array. The scintillator elements are fabricated from polycrystalline ceramic scintillator material or single crystal scintillation material. To increase the spatial resolution and the signal strength, the gaps between the scintillator elements are filled with a reflective material.

U.S. Pat. No. 6,117,236 relates to a pixelated scintillation layer in which high aspect ratio columns of scintillating material are formed. Wells may be formed in a body, and filled with scintillation material dispersed in a solvent/binder. A reflective coating may be deposited over the surface of the wells, e.g. by aluminum evaporation or electrochemical deposition.

U.S. Pat. No. 5,519,227 relates to a structured scintillation screen, where a pixelated structure having well-defined spatial geometries and depths is micro-machined using laser ablation. Following laser processing of the substrate, the 'pixels' are surrounded with an interstitial material having a refractive index lower than that of the substrate to allow each pixel to function as an individual optic waveguide.

EP 0,534,683 relates to a radiation imager comprising an array of scintillator elements optically coupled to a photodetector array. Interstitial wall members separate adjoining scintillator elements. A solution for reflection of light photons back into the scintillator elements is provided by means of a dual-layer reflective structure that comprises a primary dielectric layer of lower optical index to reflect light photons at the interface of the scintillator element and the dielectric layer, and a supplementary optically reflective layer to allow those light photons that strike the dielectric layer with an angle of incidence greater than the critical angle and enter the dielectric layer to reflect off of the supplementary optically reflective layer.

WO 2012/004703 relates to a scintillator having an array of so-called scintillator dixels that are separated by spacers. The spacers include a reflective material that facilitates directing light produced by a dixel to a corresponding light-sensing region of a photo-sensor array.

However, there is still a general demand for even more efficient solutions, especially for the purpose of increasing the signal-to-noise ratio without reducing the image resolution (sharpness).

SUMMARY

The present invention overcomes these and other drawbacks of the prior art.

It is a general object to enable x-ray imaging with improved image quality by improving the signal-to-noise ratio without reducing the image resolution (sharpness).

It is a specific object to provide an improved x-ray scintillator.

It is also a specific object to provide an improved x-ray detector.

Another specific object is to provide an improved x-ray imaging system.

Yet another specific object is to provide an improved scintillator mold.

Still another specific object is to provide a method of fabricating an improved scintillator mold.

It is also a specific object to provide a method of fabricating a scintillator.

In a first aspect, there is provided an x-ray scintillator comprising a pore matrix having a plurality of pores formed in a substrate. Each of the pores is at least partially covered with a multi-layered coating comprising at least a reflective layer and a protective layer. The at least partially coated pores are filled with scintillating material for absorbing x-ray photons to produce secondary photons. The reflective layer of the multi-layered coating is arranged between the scintillating material and the substrate for reflecting the secondary photons, and the protective layer of the multi-layered coating is arranged between the reflective layer and the scintillating material for protecting the reflective layer while allowing reflection of the secondary photons by the reflective layer.

A purpose of this structure is to protect the reflective layer, also referred to as a reflector, from mechanical and/or chemical influences that would otherwise degrade or even damage the reflective properties. Such influences may occur during fabrication of the scintillator as well as during use of the finished device. The proposed scintillator construction allows as many as possible of these secondary photons to reach the image sensor, thereby productively contributing to high signal-to-noise ratio and a high-qualitative image.

In a second aspect, there is provided an x-ray detector comprising an x-ray scintillator according to the first aspect.

In a third aspect, there is provided an x-ray imaging system comprising an x-ray detector according to the second aspect.

In a fourth aspect, there is provided a scintillator mold comprising a pore matrix having a plurality of pores formed in a substrate. Each of the pores is at least partially covered with a multi-layered coating comprising at least a reflective layer and a protective layer, and the reflective layer of the multi-layered coating is located closer to the substrate than the protective layer.

In this way, a scintillator mold is provided that is capable of withstanding, without degradation, a subsequent melting process used to fill the pores of the mold with scintillating material.

In a fifth aspect, there is provided a method of fabricating a scintillator mold. The method involves providing a pore matrix having a plurality of pores formed in a substrate, and providing a multi-layered coating having both reflective and protective properties on at least part of the side walls and/or inner end surface of the pores. The multi-layered coating comprises at least a reflective layer, also referred to as a reflector, and an additional protective layer to protect the reflector, where the reflective layer is located closer to the substrate than the protective layer.

In a sixth aspect, there is provided a method of fabricating a scintillator. The method involves providing a scintillator mold according to the fifth aspect, and then melting scintillating material into the pores of the scintillator mold.

The invention is particularly useful in the following technical applications: Medical, dental, industrial, scientific and security x-ray applications.

Other advantages of the invention will be appreciated when reading the below detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

It is a general object to enable x-ray imaging with improved image quality by improving the signal-to-noise ratio without reducing the image resolution (sharpness).

It is an object to provide an improved scintillator, an x-ray detector comprising such an improved scintillator and an x-ray imaging system comprising such an x-ray detector.

It is also an object to provide an improved scintillator mold, as well as a method of fabricating such a scintillator mold and a method of fabricating a scintillator.

In particular it is desirable to construct a scintillator in such a way that as many secondary photons as possible are generated in the scintillation process, and that the scintillator construction allows as many as possible of these secondary photons to reach the image sensor, thereby productively contributing to high signal-to-noise ratio and a high-qualitative image.

Figure 1:
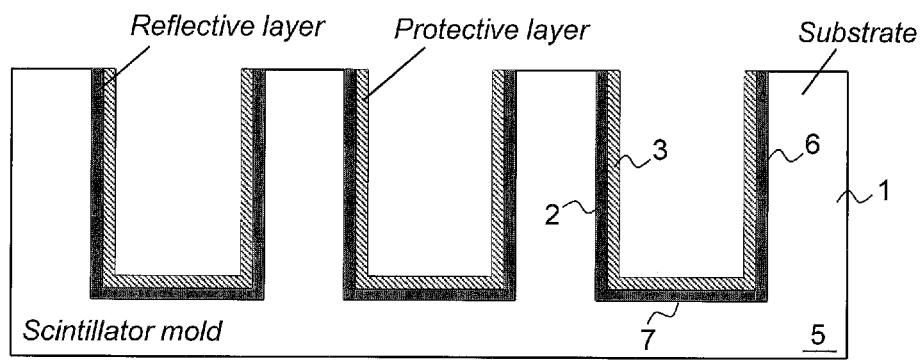
FIG. 1 is a schematic cross-section illustrating an example of a scintillator mold according to an embodiment.

FIG. 1 is a schematic cross-section illustrating an example of a scintillator mold according to an embodiment. In this example, the scintillator mold 5 comprises a pore matrix having a plurality of pores formed in a substrate 1. Each of the pores is at least partially covered with a multi-layered coating comprising at least a reflective layer 2 and a protective layer 3, and the reflective layer 2 of the multi-layered coating is located closer to the substrate 1 than the protective layer 3.

Figure 2:
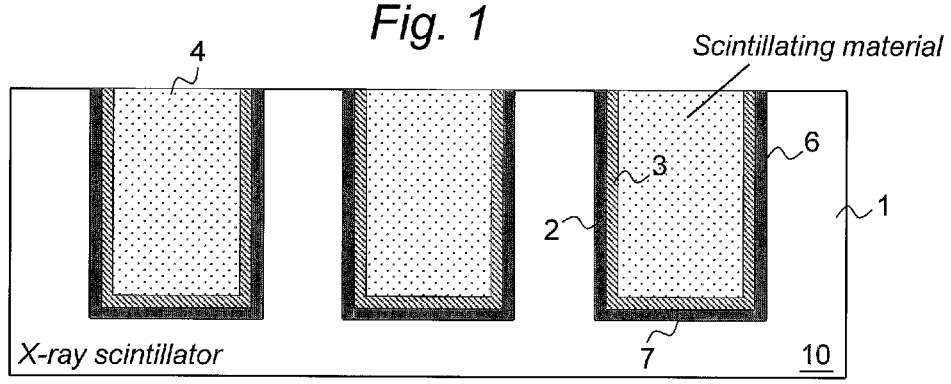
FIG. 2 is a schematic cross-section illustrating an example of an x-ray scintillator according to an embodiment.
Figure 3:
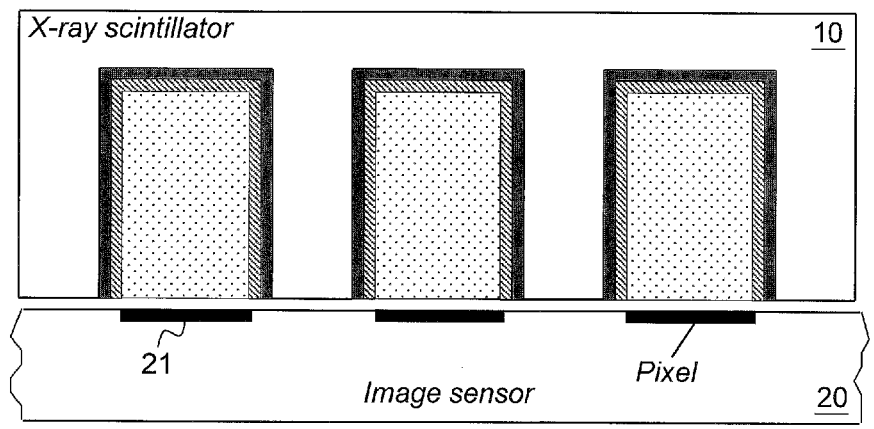
FIG. 3 is a schematic cross-section illustrating an example of an x-ray scintillator in configuration with an image sensor according to an embodiment.

It should be understood that FIGS. 1 to 3 are only schematic illustrations, where certain parts are not necessarily in proportion in order to more clearly illustrate the different parts of the overall structure.

In this way, a scintillator mold 5 is provided that is capable of withstanding, without degradation, a subsequent melting process used to fill the pores of the mold with scintillating material. The protective layer 2 is designed to protect the reflective layer from mechanical and/or chemical influences that would otherwise degrade or even damage the reflective properties, while allowing reflection of secondary photons by the reflective layer.

FIG. 2 is a schematic cross-section illustrating an example of an x-ray scintillator according to an embodiment. In this example, the x-ray scintillator comprises a pore matrix having a plurality of pores formed in a substrate 1. Each of the pores is at least partially coated or covered with a multi-layered coating comprising at least a reflective layer 2 and a protective layer 3. The at least partially coated pores are filled with scintillating material 4 for absorbing x-ray photons to produce secondary photons, preferably with a wavelength in the visible range. The reflective layer 2 of the multi-layered coating is arranged between the scintillating material 4 and the substrate 1 for reflecting the secondary photons, and the protective layer 3 of the multi-layered coating is arranged between the reflective layer 2 and the scintillating material 4 for protecting the reflective layer 2 while allowing reflection of the secondary photons by the reflective layer.

The reflective layer 2, which is also referred to as a reflector, is thus adapted for reflecting the secondary photons, and the protective layer 3 is adapted for protecting the reflector while allowing reflection of the secondary photons by the reflector.

Although the pores are illustrated as completely coated, it should be understood that any one of the pores may be partially coated or covered by the multi-layered coating.

As an example, the multi-layered coating is provided on at least part of the side walls 6 and/or inner end surface 7 of the pores. Preferably, the multi-layered coating covers the side walls 6 and the inner end surface 7 of the pores.

The proposed scintillator construction allows as many as possible of these secondary photons to reach the image sensor, thereby productively contributing to high signal-to-noise ratio and a high-qualitative image.

FIG. 3 is a schematic cross-section illustrating an example of an x-ray scintillator in configuration with an image sensor according to an embodiment. Preferably, the pores of the scintillator 10 are aligned with the pixels 21 of the image sensor 20 for high detector performance. The at least partially coated pores, filled with scintillating material, then act as light guides, each pore leading secondary photons to one or more pixel(s) 21 of the pixelated image sensor 20. It is not necessary to have a one-to-one mapping between pores and pixels. As can be seen in the example illustrated in FIG. 3, the open ends of the filled pores are preferably directed towards the pixelated image sensor and arranged adjacent to or at least in close vicinity of the pixels.

In other words, according to an example, there is provided a scintillator comprising an embedded reflector on the side walls and preferably also the inner end surface of the pores which serves to reflect secondary photons towards an associated image sensor, and an additional protective layer provided over or on top of the reflector. The protective layer is configured to protect the reflector while still allowing reflection of the secondary photons by the reflector.

The purpose of this structure is to protect the reflector from mechanical and/or chemical influences that would otherwise degrade or even damage the reflective properties. Such influences may occur during fabrication of the scintillator as well as during use of the finished device.

By way of example, the reflector includes one or multiple metal layers and/or one or multiple dielectric layers.

The protective layer may include one or more layers. For example, the protective layer includes one or more dielectric layers. As an example, the protective layer can be made of multiple layers to provide optical properties that does not cause destructive interference. It is also possible to provide an additional surface layer on the protective layer to provide a strong chemical bond to the scintillating material.

In the case of a reflector made up of multiple dielectric layers, the layers are for example most commonly of quarter-wavelength thickness and different/alternating refractive indices, resulting in constructive interference, thereby high reflectivity, for the wavelength of the secondary photons.

It is also possible to arrange the reflector between an optional bottom layer (which is then arranged between the substrate and reflector) and the protective layer (which is arranged between the reflector and the scintillating material). Preferably, the bottom layer is a dielectric layer or otherwise with good mechanical adherence and temperature stability. In other words, the multi-layered coating optionally comprises a bottom layer arranged between the substrate and the reflective layer, and the reflective layer is arranged between the bottom layer and the protective layer.

The invention offers the ability to capture x-ray images of high resolution and high signal-to-noise ratio.

The invention will now be described with reference to some exemplary and non-limiting embodiments.

Figure 4:
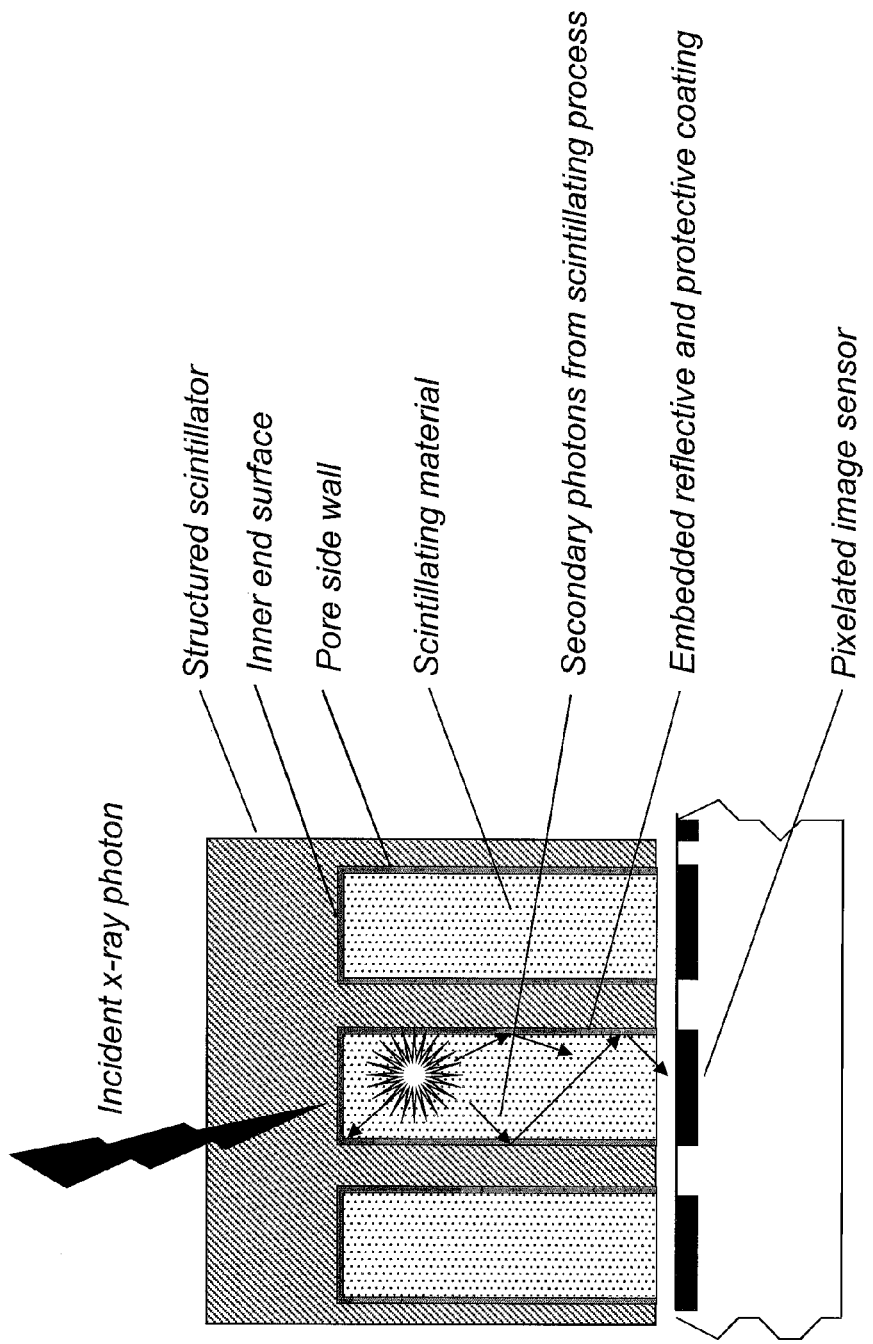
FIG. 4 is a schematic cross-section illustrating an example of a scintillator in combination with a pixelated image sensor according to a particular embodiment.

FIG. 4 shows an exemplary scintillator and an image sensor in a typical configuration for x-ray imaging. In particular, FIG. 4 is a cross section of an example of a structured scintillator and a pixelated image sensor, showing the absorption of an incoming x-ray photon and generation of secondary photons in the scintillating material. An embedded reflective and protective coating covers the side surfaces and the inner end surface of the pores.

The scintillator absorbs x-ray photons and, for each such x-ray photon, emits a burst of photons, typically with a wavelength in the visible range, thus generating a light image that can be captured by a light-sensitive image sensor such as a charge-coupled device (CCD) or CMOS imaging sensor (CIS). However, by laws of nature, a scintillator can only absorb a certain fraction of x-ray photons that enter the scintillator's surface. As a consequence, it is important for best detector performance and image quality to best utilize the information carried by each x-ray photon that is absorbed in the scintillator. Because of noise generated in the image sensor, it is important to construct the scintillator so as to maximize the number of secondary photons that reach and can be detected by the image sensor.

The basic structure of the scintillator exemplified in FIG. 4 is defined by a pore matrix having a plurality of pores, or holes, formed in a substrate, wherein the pores are filled with scintillating material. By way of example, the pores may be etched in silicon (Si) with high precision, using commercially available silicon processing methods. The pores are typically filled with the scintillating material through a melting process. Subsequently, during the solidification phase, the scintillating material typically crystallizes inside the pores. In other words, in the completed scintillator, the filled pores typically include solidified melted scintillating material. Any suitable scintillating material can be used, such as Cesium Iodide, CsI, or Thallium doped CsI.

In a particular example, the proposed scintillator comprises an embedded reflective coating, referred to as a reflector, on the pore walls and/or inner end surface which serves to reflect secondary photons towards the associated image sensor, and an additional protective layer provided on top of the reflector. The protective layer is configured to protect the reflector while still allowing light reflection of the secondary photons by the reflector.

In a sense, the proposed technology introduces a multi-layered coating having both reflective and protective properties, which multi-layered coating is provided on at least part of the pore walls and/or inner end surface before the scintillating material is melted into the pores.

For example, the multi-layered coating comprises at least a reflective layer, i.e. a reflector, and an additional protective layer.

Preferably, the reflective and protective multi-layer coating covers the side walls and the inner end surface of the pores. This will result in an x-ray detector with good signal-to-noise ratio.

The reflective layer and the protective layer can be regarded as superimposed layers, where the reflective layer is located closer to the substrate than the protective layer.

In this way, the multi-layer coating (i) provides good reflectivity, (ii) withstands the melting temperature of the scintillating material, and (iii) provides the reflector with protection against mechanical and/or chemical degradation.

In other words, the proposed technology allows a pore matrix with an embedded reflective and protective multi-layered coating constructed such that it withstands, without degradation, the melting process used to fill the pores with scintillating material. The result is a structured scintillator with high light output, and thereby high signal-to-noise ratio.

Typically, the thickness of the protective layer may be selected to avoid destructive interference of secondary photons.

In a preferred example, the protective layer does not have any significant optical effect on the secondary photons. In other words, the protective layer is substantially optically inactive with respect to the secondary photons.

For example, the thickness of the protective layer is preferably smaller than one-half of the wavelength of the characteristic light emission of the scintillator. As an example, the thickness is preferably smaller than 200 nm.

In special circumstances, the thickness of the protective layer may even be smaller than 50 nm.

For some choices of protection layer, it may also be possible to select a thickness of the protective layer that is larger than ¾ of the wavelength of the characteristic light emission of the scintillator.

In this case, the protection layer may be optically active with respect to the secondary photons.

By way of example, for some materials, the thickness of the protective layer may be smaller than 50 nm or larger than 300 nm.

The noise characteristics of a captured x-ray image may be interpreted as the signal-to-noise ratio (SNR), and the protected, embedded reflector may thus be regarded as an SNR-improving feature of the scintillator and thereby of the x-ray imaging system.

Figure 5:
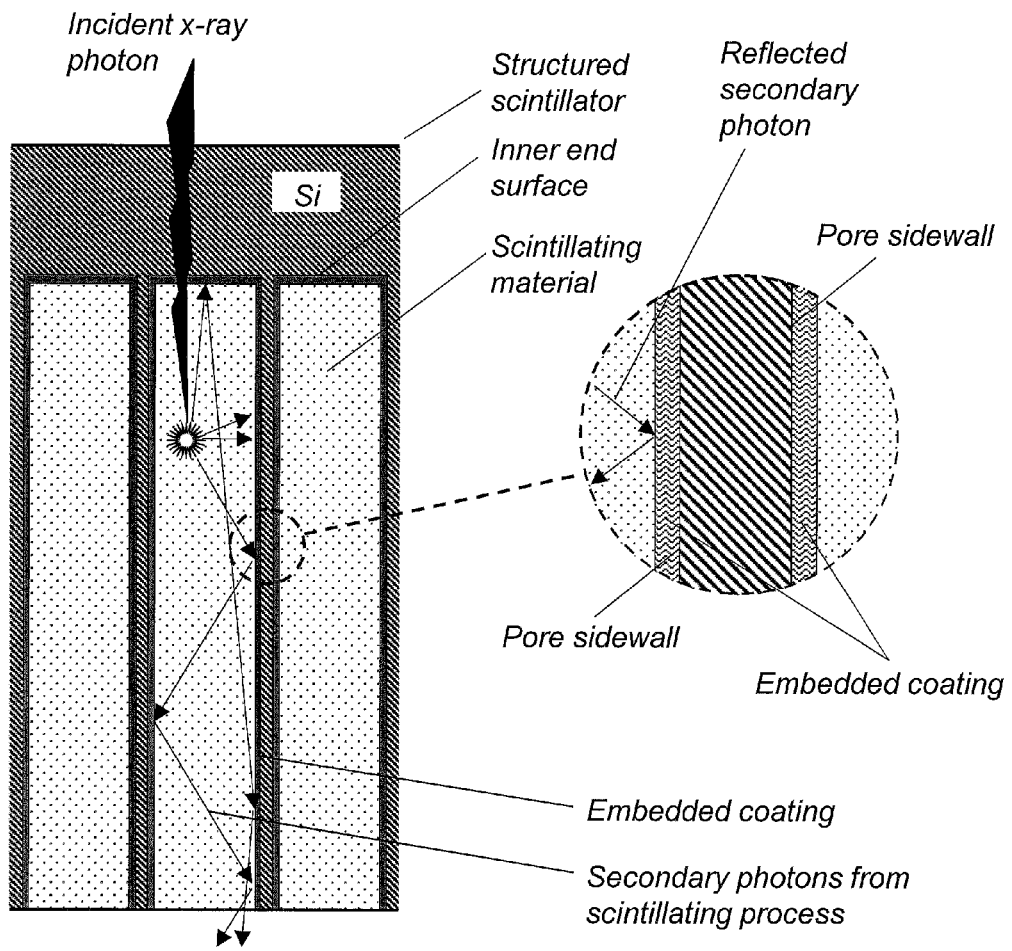
FIG. 5 is a schematic cross-section illustrating an example of a scintillator according to a particular embodiment.

FIG. 5 shows an exemplary cross section of a structured scintillator, which illustrates how secondary photons are reflected against an embedded reflective and protective coating which is applied on the inner end surface and/or the side walls. In particular, FIG. 5 shows the absorption of an incoming x-ray photon and generation of secondary photons in the scintillating material. In this example, the embedded coating covers the sidewalls of the pores and preferably also the inner end surface.

Figure 6:
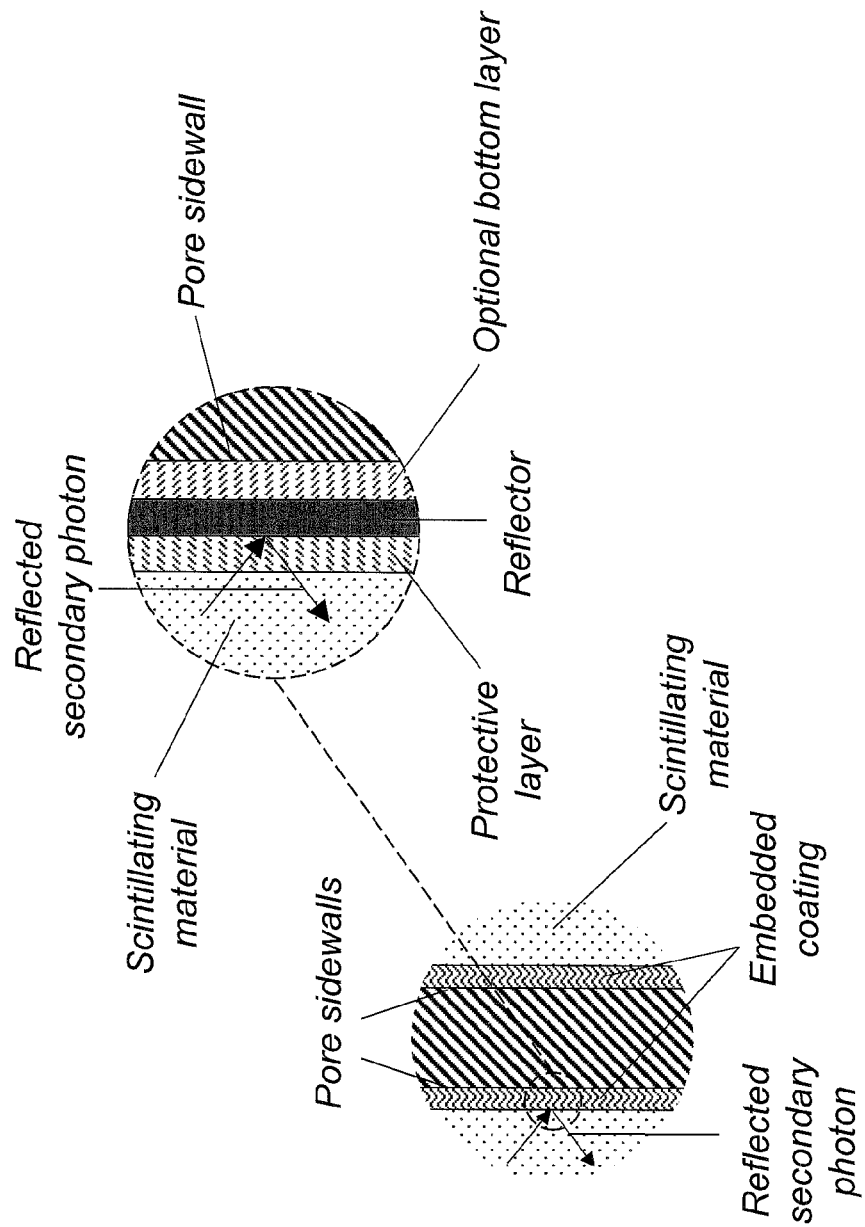
FIG. 6 is a schematic cross-section illustrating an example of a sidewall separating two adjacent pores in a scintillator according to a particular embodiment.

FIG. 6 shows an exemplary cross section of a wall between two pores of a structured scintillator, which in this example comprises a core of silicon with an embedded multi-layer coating having both reflective and protective properties. In this example, the multi-layer coating comprises a reflector between an optional bottom layer (between substrate and reflector) and a protective top layer (between reflector and scintillating material). Preferably, both sides of the wall are covered with a reflective and protective coating that comprises an optional bottom layer, a reflector and a protective layer. It should be understood that the wall between two pores has two sides, and from the perspective of the pores they define two different side walls.

The reflective layer, i.e. the reflector, in turn can be made up of one or multiple metal layers, or one or multiple dielectric layers. In the case of a reflective layer made up of multiple dielectric layers, the layers are for example most commonly of quarter-wavelength thickness and different or alternating high ("H") and low ("L") refractive indices (HL, HLH, HLHL, . . . ), resulting in constructive interference, thereby high reflectivity, for the wavelength of the secondary photons.

The purpose of this structure is to protect the reflector from mechanical and/or chemical influences that would otherwise degrade or even damage the reflective properties. Such influences may occur during fabrication of the scintillator as well as during use of the finished device.

In an exemplary embedded reflector, the optional bottom layer (if present) may comprise one or several layer(s) of oxides, nitrides and/or silicides with good mechanical adherence. The reflector may comprise one or several metal layer(s) or one or several dielectric layers. In case of a metal reflector, this may comprise one or several layer(s) of metal(s) with good reflectivity and sufficient thermal stability. In case of a dielectric stack type reflector, the dielectric layers are as an example most commonly of quarter-wavelength thickness and different or alternating high ("H") and low ("L") refractive indices. The protective layer may comprise one or several layer(s), for example made of transparent oxide, nitride and/or silicide with a thickness chosen to avoid destructive interference of secondary photons. A few non-limiting examples are summarized in the table below.

| Layer | Material |
|---|---|
| Bottom layer (optional) | None/ Oxide, nitride and/or silicide with good adherence |
| Reflector | Alt. 1: Metal with good reflectivity and sufficient thermal stability Alt. 2: Dielectric stack comprising multiple dielectric layers of alternating high and low refractive indices. |
| Protective layer | Transparent oxide, nitride and/or silicide with thickness chosen to avoid destructive interference of secondary photons. |

Figure 7:
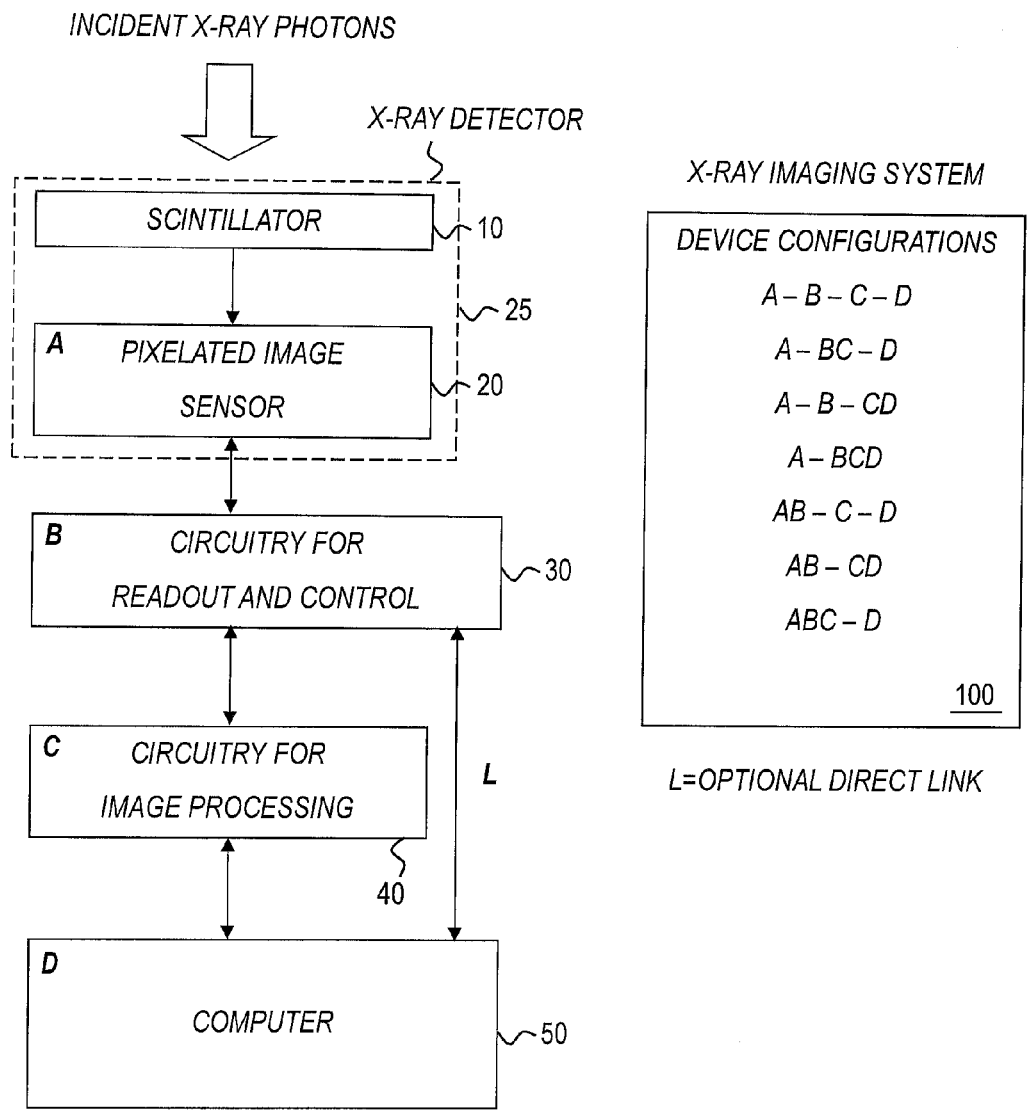
FIG. 7 is a schematic block diagram illustrating an example of possible configurations of an x-ray imaging system.

FIG. 7 is an exemplary block diagram of typical setups of an x-ray imaging device or system, including a scintillator 10, an image sensor 20 (A), circuitry 30 for readout and control (B), circuitry 40 for image processing (C) and a computer 50 (D). Possible device configurations are shown to the right, where hyphen ("-") denotes separation between devices. As indicated there exist a wide variety of different possible device configurations.

The scintillator 10 is configured for absorbing x-ray photons and emitting photons with a wavelength in the visible range to thus generate a light image. The image sensor 20 is arranged in combination with the scintillator 10 and configured for capturing the light image.

The scintillator 10 is constructed as described above. The image sensor 20 is preferably a pixelated image sensor having a number of pixels. If possible from a cost-effective perspective, the pores of the scintillator 10 may for example be aligned with one or more of the pixels of the image sensor for optimized detector performance. It is not necessary to have an ideal one-to-one mapping between the pores and the pixels. For example, the pores and the pixels may have different geometries in cross-section.

It should also be understood that circuitry 20 and 30 (A and B) may be integrated. Alternatively, circuitry 30 and 40 (B and C) may be integrated, or all of circuitry 20, 30 and 40 (A, B and C) may be integrated. It is also possible to integrate circuitry 30 and/or 40 (B and/or C) in the computer 50 (D). The direct link "L" between circuitry 30 (B) and circuitry 50 (D) is optional. In FIG. 4, bi-directional arrows indicate bi- or unidirectional communication.

The scintillator 10 and the image sensor 20 define an x-ray detector.

The invention thus provides an improved x-ray scintillator as well as a corresponding method of fabricating such an x-ray scintillator. The invention also provides an improved scintillator mold as well as a corresponding method of fabricating such a scintillator mold.

Figure 8:
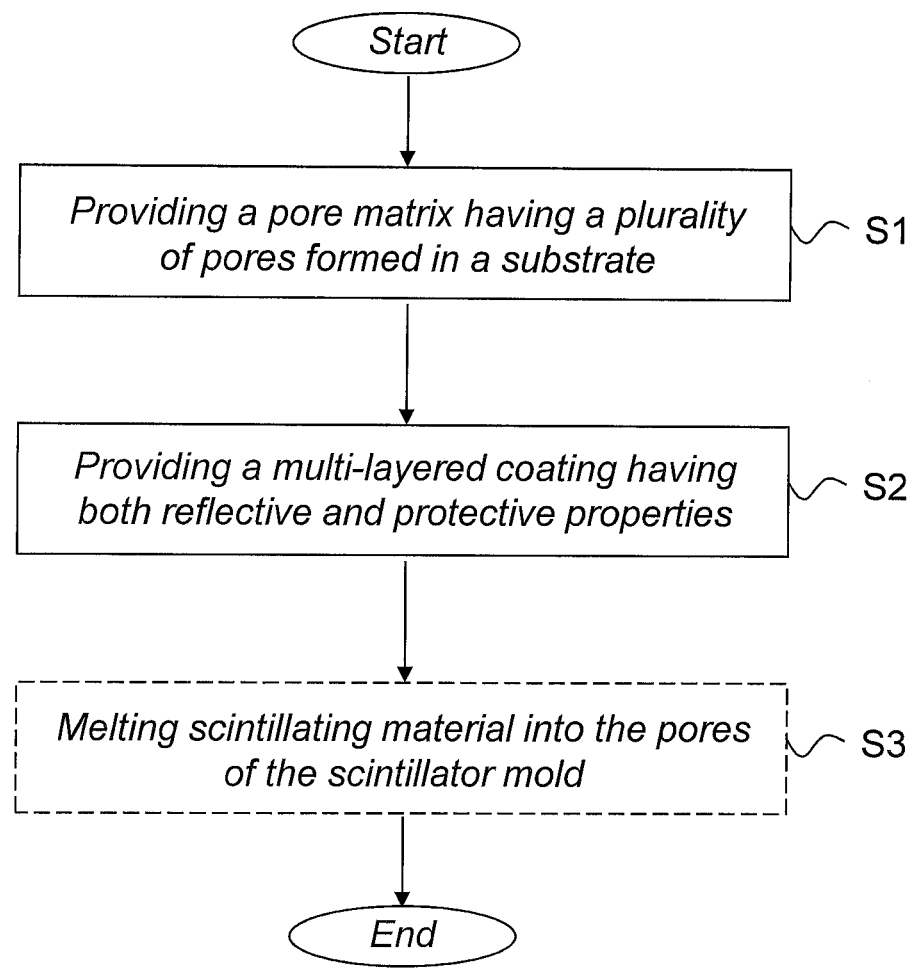
FIG. 8 is a schematic flow diagram illustrating an example of a method for manufacturing a scintillator mold, and optionally melting scintillating material into the pores of the scintillator mold to provide a method for manufacturing a scintillator.

FIG. 8 is a schematic flow diagram illustrating an example of a method for manufacturing a scintillator mold, and optionally melting scintillating material into the pores of the scintillator mold to provide a method for manufacturing a scintillator.

The method for manufacturing a scintillator mold involves providing a pore matrix having a plurality of pores formed in a substrate in step S1, and providing a multi-layered coating having both reflective and protective properties on at least part of the pore walls and/or inner end surface of the pores in step S2. The multi-layered coating comprises at least a reflective layer, also referred to as a reflector, and an additional protective layer to protect the reflector, where the reflective layer is located closer to the substrate than the protective layer.

In the method of fabricating a scintillator, the above-described method is extended with the melting of scintillating material into the pores of the scintillator mold, as indicated by step S3. Once the scintillating material is solid, the scintillator is ready for use.

Preferably, the scintillating material is selected for absorbing x-ray photons to produce secondary photons with a wavelength in the visible range. The reflective layer of the multi-layered coating is arranged between the scintillating material and the substrate for reflecting the secondary photons, and the protective layer of the multi-layered coating is arranged between the reflective layer and the scintillating material for protecting the reflective layer while allowing reflection of the secondary photons by the reflective layer.

In other words, the method of fabricating a scintillator includes the steps of providing a pore matrix having a plurality of pores, and using the pore matrix as a mold when melting scintillating material into the pores, and providing a multi-layered coating having both reflective and protective properties on at least part of the pore walls and/or inner end surface before the scintillating material is melted into the pores.

By way of example, the step of providing a multi-layered coating includes the steps of applying an optional bottom layer, and a reflective coating, referred to as a reflector, on the pore walls and/or inner end surface, and applying an additional protective layer on top of the reflector. The protective layer is configured to protect the reflector while still allowing light reflection of the secondary photons by the reflector.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. An x-ray scintillator comprising a pore matrix having a plurality of pores formed in a substrate, wherein each of said pores is at least partially covered with a multi-layered coating comprising at least a reflective layer and a protective layer,
wherein said at least partially coated pores are filled with scintillating material for absorbing x-ray photons to produce secondary photons, said at least partially coated pores are filled with scintillating material through a melting process such that the filled pores include solidified, melted scintillating material,
wherein said reflective layer of said multi-layered coating is arranged between the scintillating material and the substrate for reflecting the secondary photons, and
wherein said protective layer of said multi-layered coating is arranged between the reflective layer and the scintillating material for protecting the reflective layer while allowing reflection of the secondary photons by the reflective layer,
wherein the protective layer is substantially optically inactive with respect to the secondary photons so that the protective layer does not have any significant optical effect on the secondary photons, and
the multi-layered coating is constructed such that the multi-layered coating withstands, without degradation, the melting process used to fill the pores with scintillating material.

2. The x-ray scintillator of claim 1, wherein said multi-layered coating is provided on at least part of the side walls and/or inner end surface of the pores.

3. The x-ray scintillator of claim 2, wherein said multi-layered coating covers the side walls and the inner end surface of the pores.

4. The x-ray scintillator of claim 1, wherein the multi-layered coating further comprises a bottom layer arranged between the substrate and the reflective layer, and the reflective layer is arranged between the bottom layer and the protective layer.

5. The x-ray scintillator of claim 1, wherein the thickness of the protective layer is selected to avoid destructive interference of secondary photons.

6. The x-ray scintillator of claim 1, wherein the thickness of the protective layer is preferably smaller than one-half of the wavelength of the characteristic light emission of the scintillator.

7. The x-ray scintillator of claim 1, wherein the reflective layer includes one or multiple metal layers and/or one or multiple dielectric layers.

8. The x-ray scintillator of claim 7, wherein the reflective layer is made of multiple dielectric layers, and the layers are of quarter-wavelength thickness and alternating high and low refractive indices.

9. The x-ray scintillator of claim 1, wherein the protective layer includes one or more layers.

10. The x-ray scintillator of claim 9, wherein the protective layer includes one or more dielectric layers.

11. An x-ray detector comprising an x-ray scintillator of claim 1.

12. An x-ray imaging system comprising an x-ray detector of claim 11.

13. A method of fabricating a scintillator mold comprising the steps of:
providing a pore matrix having a plurality of pores formed in a substrate;
providing a multi-layered coating on at least part of the side walls and/or inner end surface of the pores;
providing a scintillator mold; and
melting scintillating material into the pores of the scintillator mold,
wherein said multi-layered coating comprises at least a reflective layer, also referred to as a reflector, and an additional protective layer to protect the reflector, and said reflective layer is located closer to the substrate than said protective layer, wherein the protective layer is designed to protect the reflective layer from mechanical and/or chemical influences that would otherwise degrade or even damage the reflective properties, while allowing reflection of secondary photons by the reflective layer, whereby a scintillator mold is provided that is capable of withstanding, without degradation, a subsequent melting process used to fill the pores of the mold with scintillating material.

14. The method of claim 13, wherein said scintillating material is selected for absorbing x-ray photons to produce secondary photons with a wavelength in the visible range, wherein said reflective layer of said multi-layered coating is arranged between the scintillating material and the substrate for reflecting the secondary photons, and wherein said protective layer of said multi-layered coating is arranged between the reflective layer and the scintillating material for protecting the reflective layer while allowing reflection of the secondary photons by the reflective layer.

* * * * *